United States Patent
Fan et al.

(10) Patent No.: US 7,115,333 B2
(45) Date of Patent: Oct. 3, 2006

(54) HIGH TEMPERATURE COMPOSITE PROTON EXCHANGE MEMBRANES

(75) Inventors: Qinbai Fan, Chicago, IL (US); Hamid Hussain, Bolingbrook, IL (US)

(73) Assignee: Gas Technology Institute, Des Plaines, IL (US)

( * ) Notice: Subject to any disclaimer, the term of this patent is extended or adjusted under 35 U.S.C. 154(b) by 505 days.

(21) Appl. No.: 10/430,476

(22) Filed: May 6, 2003

(65) Prior Publication Data

US 2004/0157131 A1   Aug. 12, 2004

Related U.S. Application Data

(60) Provisional application No. 60/445,927, filed on Feb. 7, 2003.

(51) Int. Cl.
*H01M 8/10* (2006.01)
(52) U.S. Cl. .................. 429/33; 429/30; 429/317; 429/305; 429/309; 429/314; 429/315
(58) Field of Classification Search ............ 429/317, 429/305, 309, 314, 33, 30, 315
See application file for complete search history.

(56) References Cited

U.S. PATENT DOCUMENTS

| 3,265,536 A | 8/1966 | Miller et al. |
|---|---|---|
| 3,676,326 A | 7/1972 | Marze |
| 4,664,761 A | 5/1987 | Zupancic et al. |
| 5,409,785 A | 4/1995 | Nakano et al. |
| 5,460,896 A | 10/1995 | Takada et al. |
| 5,643,689 A | 7/1997 | Fleischer et al. |
| 6,537,468 B1 | 3/2003 | Hata et al. |
| 2002/0155341 A1* | 10/2002 | Finkelshtain et al. .......... 429/30 |
| 2003/0219640 A1* | 11/2003 | Nam et al. .................. 429/309 |

FOREIGN PATENT DOCUMENTS

| DE | 28 10 202 A1 * | 9/1978 |
|---|---|---|
| EP | 1 085 051 | 3/2001 |
| JP | 06076838 | 3/1994 |
| JP | CN 1385915 * | 12/2002 |
| WO | WO 03/074596 A | 9/2003 |

* cited by examiner

*Primary Examiner*—Laura Weiner
(74) *Attorney, Agent, or Firm*—Mark E. Fejer

(57) ABSTRACT

An apparatus for generating electricity having an anode electrode, a cathode electrode and a proton exchange membrane comprising poly(vinyl alcohol) disposed between the anode electrode and the cathode electrode. The proton exchange membrane of this invention is suitable for operating at a temperature over an entire range of about room temperature to about 170° C. In accordance with preferred embodiments, the membrane includes one or more crosslinking agents.

3 Claims, 5 Drawing Sheets

Poly(2-acrylamido-2-methyl
-1-propanesulfonic acid)

Cross-linked Poly(2-acrylamido-2-methyl
-1-propanesulfonic acid)

HIGH TEMPERATURE COMPOSITE PROTON EXCHANGE MEMBRANES

CROSS REFERENCE TO RELATED APPLICATION

This application claims the benefit of provisional U.S. patent application Ser. No. 60/445,927 filed 07 Feb. 2003.

BACKGROUND OF THE INVENTION

1. Field of the Invention

This invention relates to electrolyte membranes suitable for use in proton exchange membrane fuel cells. More particularly, this invention relates to proton exchange membranes suitable for use in proton exchange membrane fuel cells operating at temperatures ranging from about room temperature to about 170° C.

2. Description of Related Art

A fuel cell is an electrochemical device in which the chemical energy of a reaction between a fuel and an oxidant is converted directly into electricity. The basic fuel cell unit comprises an electrolyte layer in contact with a porous anode and cathode on either side. In a typical fuel cell, a gaseous or liquid fuel is continuously fed to the anode electrode, sometimes referred to as the fuel electrode, and an oxidant, such as oxygen from air, is continuously fed to the cathode electrode, sometimes referred to as the air electrode, and electrochemical reactions occur at the electrodes to produce an electric current. Due to the limited electricity generating capacity of individual fuel cell units, a plurality of fuel cell units are typically stacked one on top of another with a bipolar separator plate separating the fuel cell units between the anode electrode of one fuel cell unit and the cathode electrode of an adjacent fuel cell unit.

There are a number of different fuel cell types which are classified based upon a variety of categories including the combination of type of fuel and oxidant, whether the fuel is processed external to or inside the fuel cell, the type of electrolyte, e.g. solid oxides, phosphoric acid, molten carbonate and proton exchange membranes, the temperature of operation and whether the reactants are provided to the fuel cell by internal or external manifolds.

This invention relates to proton exchange membrane fuel cells, also sometimes referred to as polymer electrolyte membrane fuel cells. In a proton exchange membrane fuel cell, the electrolyte is a proton conducting membrane sandwiched between two porous electrodes. The backs of the electrodes are made hydrophobic by coating with an appropriate compound, such as TEFLON®. Proton conducting membranes conventionally used in proton exchange membrane fuel cells are made of a perfluorinated sulfonic acid polymer, an example of which is sold under the brand name NAFION® by DuPont. NAFION membranes, which are fully fluorinated polymers, have exceptionally high chemical and thermal stability and are stable against chemical attack in strong bases, strong oxidizing and reducing acids, $H_2O_2$, $Cl_2$, $H_2$ and $O_2$ at temperatures up to about 100° C. NAFION consists of a fluoropolymer backbone upon which sulfonic acid groups are chemically bonded. However, although an exceptional performer, NAFION is an expensive material and makes proton exchange membrane fuel cells economically unattractive in most applications. Much of the cost of NAFION is due to two factors: the use of fluorine and the very severe reaction conditions needed to prepare the polymer.

The proton exchange membrane fuel cell is suitable for a wide range of power generating applications including vehicular applications. The proton exchange membrane fuel cell system for automobile applications requires operation at temperatures in excess of about 100° C. to reduce the size of radiators, increase fuel efficiency and provide better water and heat management. At the present time, the most common high temperature proton exchange membranes for fuel cells are inorganic metal oxide-doped NAFION and phosphoric acid doped polybenzimidazole (PBI) and its derivatives. In the metal oxide-doped NAFION membrane, the metal oxide is used to retain water within the membrane at elevated temperatures, thereby maintaining the membrane proton conductive. In the PBI membrane, the phosphoric acid is proton conductive at 120° C. to 160° C. However, these two types of membranes do not exhibit promising performance and lifetimes under fuel cell operating conditions. In the metal oxide-doped NAFION membrane, the inorganic metal oxide leaches out over time due to the absence of a stable bond between the inorganic species and the binding membrane. Similarly, in the PBI membrane, the phosphoric acid departs from the membrane with product water in the fuel cell because the phosphoric acid and the imine group in the PBI membrane are only weakly bonded. In the proton exchange membrane fuel cell, the membrane is required to operate under a wide range of temperatures from about room temperature to about 170° C. so that the fuel cell can both cool-start and operate at high temperature conditions.

Accordingly, the challenge is to find lower cost membranes having the desired properties for use as a proton conductor in proton exchange membrane fuel cells. Some of these properties include mechanically stable and durable film behavior in the cell-operating environment with long lifetimes, hydrophilicity for high conductivity and water insolubility. Low cost membranes in the form of sulfonated polystyrene membranes have been applied to proton exchange membrane fuel cells. However, these membranes can only be used at temperatures of less than about 100° C. Membranes capable of operating at higher temperatures, about 120° C. to about 170° C., have the advantages of enhanced CO tolerance, which enables simplification of the entire fuel cell system; improved cathode reaction kinetics, which enables the use of higher stack power densities; and reduced heat exchanger requirements. However, the stability of high temperature membranes is still problematic.

SUMMARY OF THE INVENTION

It is, thus, one object of this invention to provide a low cost proton conducting membrane suitable for use in proton exchange membrane fuel cells.

It is one object of this invention to provide a proton conducting membrane for a proton exchange membrane fuel cell which is capable of operating over the entire temperature range from about room temperature to about 170° C.

It is another object of this invention to provide a proton conducting membrane for a proton exchange membrane fuel cell which is mechanically and chemical stable and durable under fuel cell operating conditions.

It is another object of this invention to provide a proton conducting membrane for use in proton exchange membrane fuel cells having high conductivity.

These and other objects of this invention are addressed in an apparatus for generating electricity comprising an anode electrode and a cathode electrode by a composite proton exchange membrane comprising poly(vinyl alcohol) (PVA)

and/or poly(vinyl ethylene alcohol) (PVEA) and at least one cross-linking agent disposed between the anode electrode and the cathode electrode. In accordance with one particularly preferred embodiment, the at least one cross-linking agent is glyoxal. Other suitable cross-linking agents include aldehyde, nitrilo tris (methylene) tri phosphonic acid, poly (2-acrylamido-2-methyl-1-propanesulfonic acid), phosphonic acetic acid, sulfosuccinic acid, sulfoacetic acid, and combinations thereof. These membranes are both hydrophilic and stable in water as well as under fuel cell operating conditions. In addition, in those membranes employing phosphonic acid and propanesulfonic acid, the phosphonic acid and sulfonic acid groups are proton conductive when water is present. The phosphonic acid is polymerized using phosphoric acid and forms a hydrogen bond with phosphoric acid, which can be used in a fuel cell operating at temperatures in the range of about 120° C. to about 170° C. The polymerized phosphoric acid cross-linked in the poly(vinyl alcohol) and/or poly(vinyl ethylene alcohol) is stable under humidified fuel cell operating conditions and unhumidified high temperature fuel cell operating conditions.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

Figure 1:
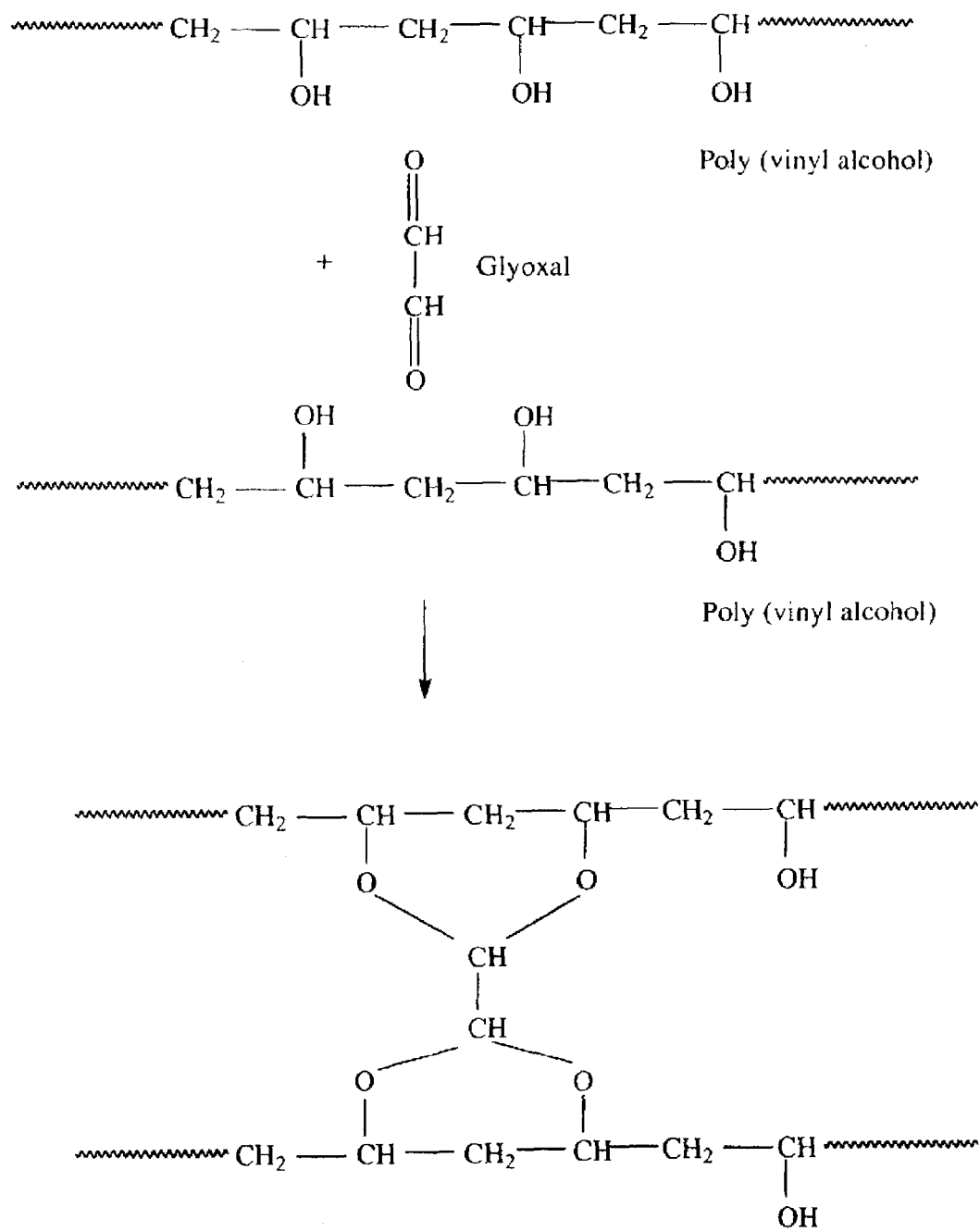
FIG. 1 is a drawing showing the reactions for producing a proton exchange membrane comprising glyoxal as a cross-linking agent in accordance with one embodiment of this invention.

The invention disclosed herein is directed to a proton exchange membrane fuel cell comprising an anode electrode, a cathode electrode and an electrolyte disposed between the anode electrode and the cathode electrode. The electrolyte is a composite proton exchange membrane comprising a backbone structure comprising poly(vinyl alcohol) and is suitable for use over the range of fuel cell operating temperatures from about room temperature to about 170° C. In accordance with one embodiment of this invention, the membrane further comprises at least one cross-linking agent, preferably glyoxal. FIG. 1 is a diagram showing the basic reaction between poly(vinyl alcohol) and the cross-linking agent glyoxal, which produces the cross-linked poly(vinyl alcohol) membrane. This is an inter-molecular cross-link. As an alternative to glyoxal, aldehyde may be employed as a cross-linking agent. However, its use is not preferred because it may not produce enough space for embodying other polymers.

Figure 2:
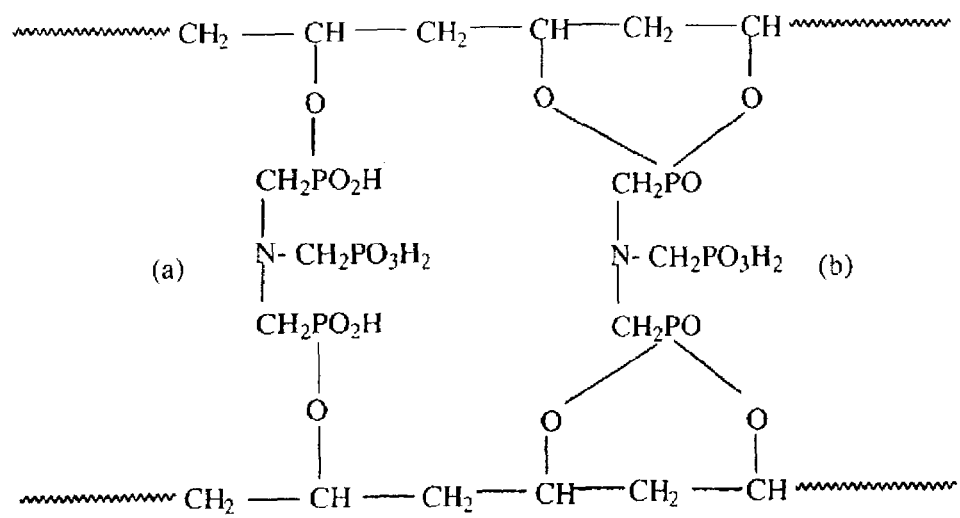
FIG. 2 is a drawing showing the reactions for producing a proton exchange membrane comprising nitrilo tris (methylene) tri phosphonic acid as a cross-linking agent in accordance with one embodiment of this invention.

In addition to, or as an alternative to, glyoxal, nitrilo tris (methylene) tri phosphonic acid may be employed as a cross-linking agent in accordance with alternative embodiments of this invention. The product from cross-linking the poly(vinyl alcohol) backbone structure with nitrilo tris (methylene) tri phosphonic acid is shown in FIG. 2. This product consumes OH bonds from the phosphonic acid and, thus, does not provide the membrane with the full extent of desired proton conductivity. However, in accordance with one embodiment of this invention, the product shown in FIG. 2 may be reduced by the addition of an oxidant, such as hydrogen peroxide, to the nitrilo tris (methylene) tri phosphonic acid to produce the intermediates (3) and (4) shown in FIG. 3, both of which have OH bonds to contact the poly(vinyl alcohol).

In accordance with one embodiment of this invention, the proton exchange membrane comprises a poly(vinyl alcohol) backbone cross-linked with glyoxal and nitrilo tris (methylene) tri phosphonic acid reduced by an oxidant.

Figure 4:
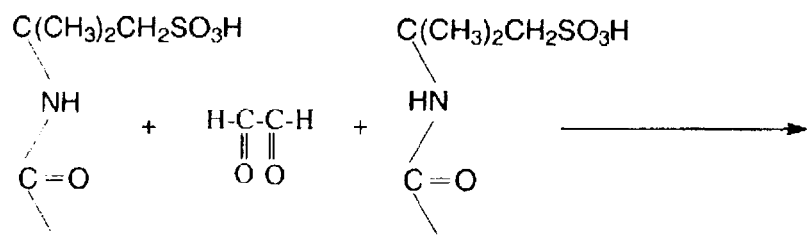
FIG. 4 is a drawing showing the reactions for producing a proton exchange membrane comprising poly(2-acrylamido-2-methyl-1-propanesulfonic acid) in accordance with one embodiment of this invention.
Figure 4:
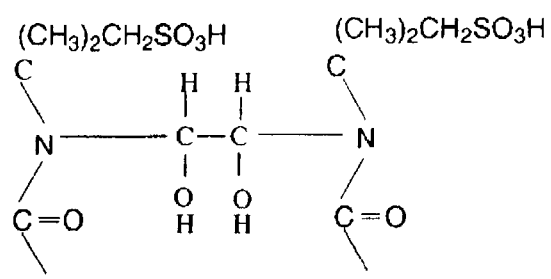

In accordance with another embodiment of this invention, the poly(vinyl alcohol) backbone is cross-linked with poly (2-acrylamido-2-methyl-1-propanesulfonic acid) and glyoxal in accordance with the reaction shown in FIG. 4. This reaction is desirable for providing proton conductivity to the membrane.

From the reactions shown in FIGS. 1–4, there are three embodiments of the proton exchange membrane of this invention that are particularly preferred. In all three of these embodiments, the acids in these composite membranes are stable because there is a strong bond between the acids and the poly(vinyl alcohol) membrane backbone.

Figure 3:
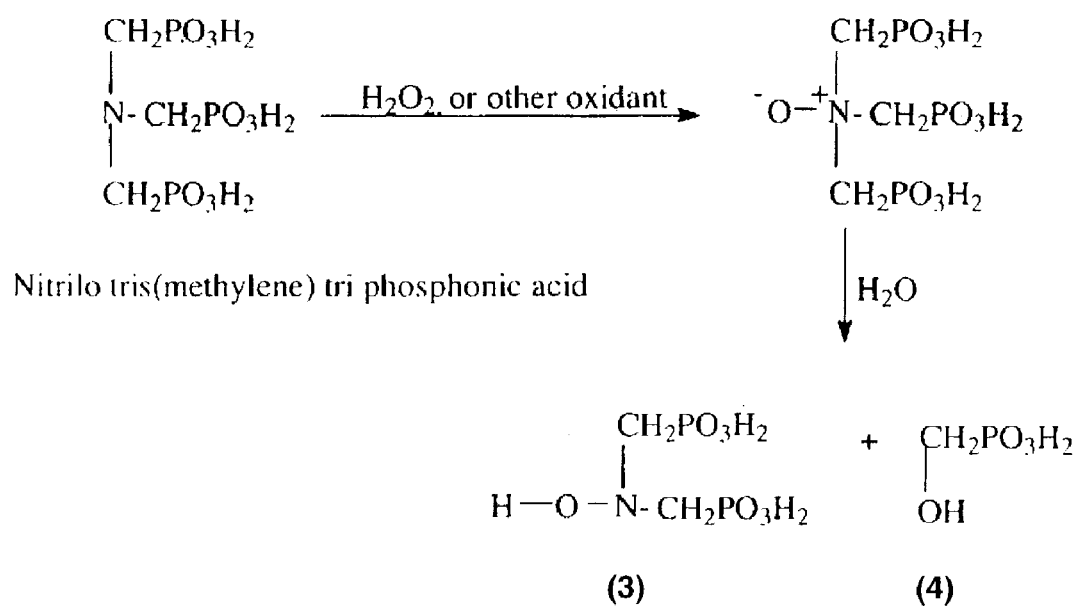
FIG. 3 is a drawing showing reactions for producing additional elements of the proton exchange membrane comprising nitrilo tris (methylene) tri phosphonic acid in accordance with one embodiment of this invention.

The first of these three embodiments is the combination of the products of FIGS. 1 and 3, namely poly(vinyl alcohol) cross-linked with glyoxal and the intermediates resulting from the reduction of nitrilo tris (methylene) tri phosphonic acid with an oxidant. The second particularly preferred embodiment is poly(vinyl alcohol) cross-linked with glyoxal, the intermediates resulting from the reduction of nitrilo tris (methylene) tri phosphonic acid with an oxidant, and poly(2-acrylamido-2-methyl-1-propanesulfonic acid). Each of these two embodiments is proton conductive at elevated temperatures due to the phosphonic group, which provides more freedom for the protons in the membranes.

The third particularly preferred embodiment of the above-mentioned three preferred embodiments is a proton exchange membrane comprising poly(vinyl alcohol) cross-linked with glyoxal and poly(2-acrylamido-2-methyl-1-propanesulfonic acid). This membrane is proton conductive so long as the membrane is wet, that is so long as the fuel cell is operating at a temperature below 100° C.

Figure 5:
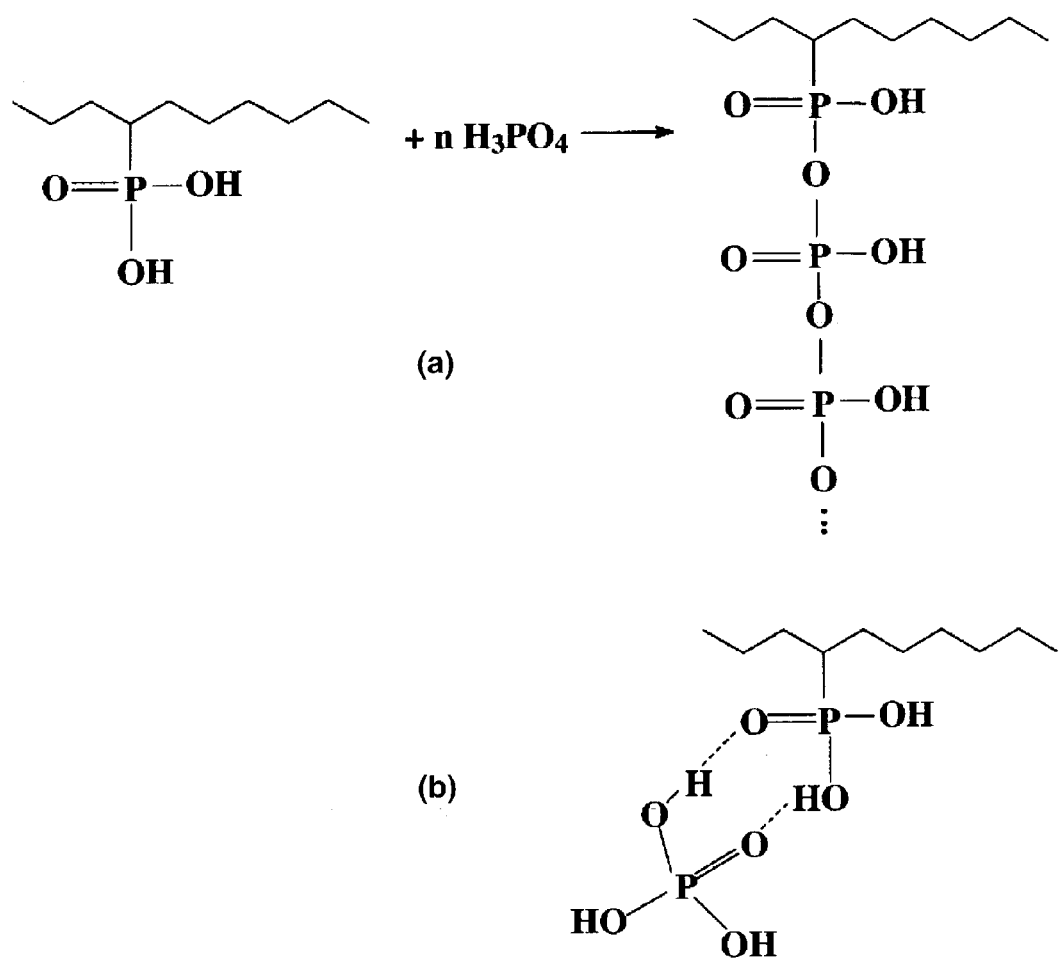
FIG. 5 is a drawing showing (a) the polymerization of phosphonic acid using phosphoric acid and (b) the formation of hydrogen bonds between phosphonic acid and phosphoric acid.

FIG. 5 shows the use of phosphoric acid for the polymerization of phosphonic acid and the formation of a hydrogen bond between the phosphonic acid and phosphoric acid in the PVA chain. This polymer enables the fuel cell to operate from room temperature to about 170° C. The use of PVEA renders the membrane mechanically stronger than membranes using PVA. However, the mixture of PVA and PVEA improves both physical and mechanical membrane properties.

EXAMPLE 1

In this example, the following reactants are employed to produce a proton exchange membrane in accordance with one embodiment of this invention:

| | |
|---|---|
| Poly (vinyl alcohol) (5% aqueous solution) | 50.0 g |
| Nitrilo tris (methylene) tri phosphonic acid (50% aqueous solution) | 5.0 g |
| Hydrogen peroxide (3% aqueous solution) | 20.0 g |
| Glyoxal (40% aqueous solution) | 3.0 g |

50.0 g of 5% solution of poly(vinyl alcohol) and 5.0 g of nitrilo tris (methylene) tri phosphonic acid are weighed in a reaction flask and stirred for 10 minutes. The reaction flask is a 500 ml 3-neck round bottom flask fitted with a mechanical stirrer, condenser and nitrogen inlet. Hydrogen peroxide solution is then added to the flask and stirred for one hour. The temperature is raised to 140° C. after which glyoxal is added. The reactants are allowed to react for an additional hour. Thereafter, the resulting solution is cooled and filtered after which the membranes are cast on a glass plate. The membranes are allowed to dry overnight and then they are placed in an oven at 90° C. to cure. During the curing process, water solubility of the membranes is monitored. When the membranes are no longer water soluble, they are removed from the oven.

EXAMPLE 2

In this example, the membrane is prepared as set forth in Example 1 with the exception that 0.3 g of phosphorus pentoxide are used in place of the hydrogen peroxide and with the further exception that the reactions are carried out at a temperature of about 100° C. instead of 140° C. By replacing hydrogen peroxide with phosphorus pentoxide, it is believed that when the phosphorus pentoxide reacts with water, phosphoric acid will be produced, which, in turn, will embed in the membrane, resulting in an increase in proton conductivity.

EXAMPLE 3

In this example, in addition to the reactants of Example 2, 2.0 g of a 5% aqueous solution of poly(2-acrylamido-2-methyl-1-propanesulfonic acid) is employed as an additional cross-linking agent. The rationale for adding this polymer as cross-linking agent is that it contains a sulfonic acid group, which, when combined with the phosphonic acid, we have found provides a substantial improvement in proton conductivity as well as better membrane performance. The membrane in this example is produced by mixing a measured amount of poly(vinyl alcohol), nitrilo tris (methylene) tri phosphonic acid and poly(2-acrylamido-2-methyl-1-propanesulfonic acid) in a 3-necked flask fitted with a condenser, mechanical stirrer and nitrogen inlet for 10 minutes, adding the oxidant phosphorus pentoxide and mixing for an additional hour. The reactants are heated to 90° C. after which glyoxal is added. The reactants are then heated for an additional 1½ hours. The resulting solution is cooled and filtered. The membrane is then cast on a TEFLON substrate and dried at room temperature overnight. The dried membrane is then cured in an oven at a temperature in the range of about 90–100° C. until the membrane is insoluble in water, at which point it is then removed from the oven.

EXAMPLE 4

In this example, the membrane is produced in accordance with the procedure of Example 3 except that 10.0 g of 3% hydrogen peroxide solution are used as an oxidant in place of the phosphorus pentoxide.

EXAMPLE 5

In this example, the following reactants are employed to produce a proton exchange membrane in accordance with one embodiment of this invention:

| | |
|---|---|
| Poly (vinyl alcohol co polyethylene) (10% solution in formic acid) | 40.0 g |
| Nitrilo tris (methylene) tri phosphonic acid (10% solution in formic acid) | 18.0 g |
| Sulfoacetic acid | 0.34 g |
| Phosphoric acid (85% aqueous solution) | 1.0 g |

In this example, nitrilo tris (methylene) tri phosphonic acid, sulfoacetic acid and phosphoric acid are added to a PEVOH solution, followed by stirring to prepare a casting solution. The casting solution is then cast onto a PTFE substrate using a glass rod. The solution is evaporated at room temperature and then in an oven at 80° C. for 1½ hours. For conducting the sulfonation and cross-linking process, the resulting membrane is heat treated at about 120° C. for about 1 hour. The resulting membrane comprises both sulfonic acid and phosphonic acid groups that make the membrane proton conducting.

EXAMPLE 6

In this example, the following reactants are employed to produce a proton exchange membrane in accordance with one embodiment of this invention:

| | |
|---|---|
| Poly (vinyl alcohol) (5% solution in deionized water) | 80.0 g |
| Phosphono acetic acid | 1.27 g |
| Sulfosuccinic acid (70% aqueous solution) | 4.60 g |
| Phosphoric acid (85% aqueous solution) | 1.13 g |

In this example, phosphono acetic acid, sulfosuccinic acid and phosphoric acid are added to a PEVOH solution, followed by stirring to prepare a casting solution. The casting solution is then cast onto a PTFE substrate using a glass rod. The solution is evaporated at room temperature and then in an oven at 80° C. for 1½ hours. For conducting the sulfonation and cross-linking process, the resulting membrane is heat treated at about 120° C. for about 1 hour. The resulting membrane comprises both sulfonic acid and phosphonic acid groups that make the membrane proton conducting.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. An apparatus for generating electricity comprising:
an anode electrode;
a cathode electrode; and
a proton exchange membrane comprising at least one of poly(vinyl alcohol) and poly(vinyl ethylene alcohol) and at least two cross-linking agents, one said cross-linking agent comprising glyoxal and a second said cross-linking agent selected from the group consisting of nitrilo tris (methylene) tri phosphonic acid, poly(2-acrylamido-2-methyl-1-propanesulfonic acid), phosphono acetic acid, sulfosuccinic acid, sulfoacetic acid, and combinations thereof, disposed between said anode electrode and said cathode electrode.

2. An apparatus for generating electricity comprising:
an anode electrode;
a cathode electrode; and
a proton exchange membrane suitable for operating at a temperature over an entire range of about room temperature to about 170° C., said proton exchange membrane comprising at least one of poly(vinyl alcohol) and poly(vinyl ethylene alcohol) cross-linked with glyoxal and at least one cross-linking agent selected from the group consisting of nitrilo tris (methylene) tri phosphonic acid reduced by a suitable oxidant, poly(2-acrylamido-2-methyl-1-propanesulfonic acid), phosphono acetic acid, sulfosuccinic acid, sulfoacetic acid, and combinations thereof.

3. An apparatus in accordance with claim 2, wherein said oxidant is hydrogen peroxide.

* * * * *